(12) United States Patent
Jindal et al.

(10) Patent No.: US 11,536,582 B2
(45) Date of Patent: Dec. 27, 2022

(54) SYSTEM AND METHOD FOR ESTIMATING TRAVEL TIME AND DISTANCE

(71) Applicant: BEIJING DIDI INFINITY TECHNOLOGY AND DEVELOPMENT CO., LTD., Beijing (CN)

(72) Inventors: Ishan Jindal, Mountain View, CA (US); Zhiwei Qin, Mountain View, CA (US); Xuewen Chen, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 200 days.

(21) Appl. No.: 16/314,457

(22) PCT Filed: Aug. 10, 2017

(86) PCT No.: PCT/CN2017/096893
§ 371 (c)(1),
(2) Date: Dec. 31, 2018

(87) PCT Pub. No.: WO2019/028763
PCT Pub. Date: Feb. 14, 2019

(65) Prior Publication Data
US 2021/0231454 A1    Jul. 29, 2021

(51) Int. Cl.
*G01C 21/36*    (2006.01)
*G01C 21/34*    (2006.01)
(Continued)

(52) U.S. Cl.
CPC ..... *G01C 21/3617* (2013.01); *G01C 21/3492* (2013.01); *G01C 21/3691* (2013.01);
(Continued)

(58) Field of Classification Search
CPC ............ G01C 21/3617; G01C 21/3492; G01C 21/3691; G06K 9/6257; G06N 3/04; G06N 3/063; G06N 3/08
See application file for complete search history.

(56) References Cited

U.S. PATENT DOCUMENTS 9,015,093 B1*    4/2015    Commons ............. B60W 30/00
                                                      706/26
9,903,943 B2    2/2018    Lu et al.
(Continued)

FOREIGN PATENT DOCUMENTS

CN    102081859 A    6/2011
CN    103440768 A    12/2013
(Continued)

OTHER PUBLICATIONS

Zhan, X., Hasan, S., Ukkusuri, S.V. and Kamga, C., 2013. Urban link travel time estimation using large-scale taxi data with partial information. Transportation Research Part C: Emerging Technologies, 33, pp. 37-49. (Year: 2013).*
(Continued)

*Primary Examiner* — Eric Nilsson
(74) *Attorney, Agent, or Firm* — Sheppard Mullin Richter & Hampton LLP

(57) ABSTRACT

Systems and methods are provided for estimating travel time and distance. Such method may comprise obtaining a vehicle trip dataset comprising an origin, a destination, a time-of-day, a trip time, and a trip distance associated with each of a plurality of trips, and training a neural network model with the vehicle trip dataset to obtain a trained model. The neural network model may comprise a first module and a second module, the first module may comprise a first number of neuron layers, the first module may be configured to obtain the origin and the destination as first inputs to estimate a travel distance, the second module may comprise
(Continued)

a second number of neuron layers, and the second module may be configured to obtain the information of a last layer of the first module and the time-of-day as second inputs to estimate a travel time.

20 Claims, 7 Drawing Sheets

(51) Int. Cl.
  *G06K 9/62* (2022.01)
  *G06N 3/04* (2006.01)
  *G06N 3/063* (2006.01)
  *G06N 3/08* (2006.01)
(52) U.S. Cl.
  CPC ............. *G06K 9/6257* (2013.01); *G06N 3/04* (2013.01); *G06N 3/063* (2013.01); *G06N 3/08* (2013.01)

(56) References Cited

U.S. PATENT DOCUMENTS

2015/0350840 A1  12/2015 Pham et al.
2018/0292484 A1*  10/2018 Hoppe .................. G16H 30/40

FOREIGN PATENT DOCUMENTS

| CN | 104346926 A | 2/2015 |
| CN | 104637334 A | 5/2015 |
| CN | 104715630 A | 6/2015 |
| CN | 104900063 A | 9/2015 |
| CN | 105636197 A | 6/2016 |
| CN | 106022541 A | 10/2016 |
| JP | 2013-013261 A | 1/2013 |
| TW | 201324461 A | 6/2013 |
| TW | M474994 U | 3/2014 |
| TW | I522974 B | 2/2016 |
| WO | WO-2018099480 A1 * | 6/2018 |

OTHER PUBLICATIONS

Van Lint, J.W.C., Hoogendoorn, S.P. and van Zuylen, H.J., 2005. Accurate freeway travel time prediction with state-space neural networks under missing data. Transportation Research Part C: Emerging Technologies, 13(5-6), pp. 347-369. (Year: 2005).*
Ertuna, L., 2016. Stock Market Prediction Using Neural Network Time Series Forecasting. (Year: 2016).*
Nowicki, M., & Wietrzykowski, J. (Mar. 2017). Low-effort place recognition with WiFi fingerprints using deep learning. In International Conference Automation (pp. 575-584). Springer, Cham. (Year: 2017).*
Office Action dated Oct. 28, 2019, issued in related Taiwan Application No. 107124018 (12 pages).
International Search Report and the Written Opinion dated May 14, 2018, issued in related International Application Mo. PCT/CN2017/096893 (9 pages).
Khaled Shaban et al., "A Cascade of Artificial Neural Networks to Predict Transformers Oil Parameters", IEEE Transactions on Dielectrics and Electrical Insulation, vol. 16, No. 2, Apr. 2009, pp. 516-523.
Eun-Mi Lee et al., "Traffic Speed Prediction Under Weekday, Time, and Neighboring Links' Speed: Back Propagation Neural Network Approach", Third International Conference on Intelligent Computing, ICIC 2007, Qingdao, China, Aug. 2007 Proceedings, pp. 626-635.
Error Analysis for the Global Positioning System. https://en.wikipedia.org/wiki/Error_analysis_for_the_Global_Positioning_System. Accessed online on Dec. 13, 2020.
Flicker NYC Coordinates. https://www.flickr.com/places/info/2459115. Accessed online on Dec. 13, 2020.
Dan Claudiu Ciresan et al., Deep big multilayer perceptrons for digit recognition. In Neural networks: tricks of the trade. Springer, pp. 598-598.
Simon S. Haykin. "Neural networks and learning machines", 2009, Third Edition. Table of Contents and Preface. Pearson Upper Saddle River, NJ, USA.
Robert Hecht-Nielsen et al., 1988. Theory of the backpropagation neural network. Neural Networks 1, Supplement-1 (1988), pp. 445-448.
Geoffrey E. Hinton et al., "Reducing the dimensionality of data with neural networks", 2006, Science 313, 5786 (2006), pp. 504-507.
Kurt Hornik et al., "Multilayer feed-forward networks are universal approximators", Neural Networks 2, 5 (1989), pp. 359-366.
Yann LeCun et al., "Learning algorithms for classification: A comparison on handwritten digit recognition", Neural networks: the statistical mechanics perspective 261 (1995), 276.
Ender Faruk Morgul et al., "Commercial vehicle travel time estimation in urban networks using GPS data from multiple sources", In Transportation Research Board 92nd Annual Meeting. 2013.
Hongjian Wang et al., "A simple baseline for travel time estimation using large-scale trip data", In Proceedings of the 24th ACM SIGSPATIAL International Conference on Advances in Geographic Information Systems. 2016, ACM, 61.
Yilun Wang et al., "Travel time estimation of a path using sparse trajectories", In Proceedings of the 20th ACM SIGKDD International Conference on Knowledge Discovery and Data Mining, 2014, ACM, 25-34.
David West, "Neural network credit scoring models", Computers & Operations Research 27, 11 (2000), pp. 1131-1152.
Chris Whong, "Foiling NYC's Boro Taxi Trip Data", http://chriswhong.com/open-data/foiling-nycs-boro-taxi-trip-data/. Accessed online Dec. 13, 2020.
Chun-Hsin Wu et al., "Travel-time prediction with support vector regression", IEEE Transactions on Intelligent Transportation Systems, 5, 4 (2004), pp. 276-281.
Xianyuan Zhan et al., "Urban link travel time estimation using large-scale taxi data with partial information", Transportation Research Part C: Emerging Technologies 33 (2013), pp. 37-49.
First Search dated Sep. 20, 2022, issued in related Chinese Application No. 201780088459.3 (4 pages).

* cited by examiner

450

452: Input information on an origin and a destination to a first trained neural network module to obtain a travel distance

454: Input time information and information of a last layer of the first trained neural network module to a second trained neural network module to obtain a travel time

SYSTEM AND METHOD FOR ESTIMATING TRAVEL TIME AND DISTANCE

CROSS REFERENCE TO RELATED APPLICATION

This application is a national phase application of International Application No. PCT/CN2017/096893, filed on Aug. 10, 2017, and entitled "System And Method For Estimating Travel Time And Distance," the entire contents of which are incorporated herein by reference.

FIELD OF THE INVENTION

This disclosure generally relates to methods and devices for estimating travel time and distance.

BACKGROUND

Travel time is one of the important measures of transportation for efficient navigation and better trip planning. Accurate estimation of travel time is a crucial component in building intelligent transportation systems.

SUMMARY

Various embodiments of the present disclosure can include systems, methods, and non-transitory computer readable media configured to estimate travel time and distance. A computing system for estimating travel time and distance may comprise one or more processors and a memory storing instructions. The instructions, when executed by the one or more processors, may cause the computing system to obtain a vehicle trip dataset comprising an origin, a destination, a time-of-day, a trip time, and a trip distance associated with each of a plurality of trips, and to train a neural network model with the vehicle trip dataset to obtain a trained model. The neural network model may comprise a first module and a second module each corresponding to at least a part of the instructions. The first module may comprise a first number of neuron layers. The first module may be configured to obtain the origin and the destination as first inputs to estimate a travel distance. The second module may comprise a second number of neuron layers. The second module may be configured to obtain the information of a last layer of the first module and the time-of-day as second inputs to estimate a travel time.

In some embodiments, the memory may store instructions that when executed by the one or more processors, may cause the computing system to receive a query comprising a query origin, a query destination, and a query time-of-day, and apply the trained model to the received query to estimate the travel time and the travel distance from the query origin to the query destination for the query time-of-day.

In some embodiments, the origin and the destination may each comprise binned GPS (Global Positioning System) coordinates, and the trip time may comprise binned trip time.

In some embodiments, to train the neural network model with the vehicle trip dataset, the computing system may be caused to feed the origin and the destination to the first module to obtain the first number and a number of neurons in each of the first number of neuron layers, and compare the estimated travel distance with the trip distance to tune the first number and the number of neurons in each of the first number of neuron layers.

In some embodiments, to train the neural network model with the vehicle trip dataset, the computing system may be further caused to feed the information of the last layer of the first module and the time-of-day to the second module to obtain the second number and a number neurons in each of the second number of neuron layers, and compare the estimated travel time with the trip time to tune the second number and a number neurons in each of the second number of neuron layers.

In some embodiments, the first module may be a neural network comprising three neuron layers, and the second module may be another neural network comprising three neuron layers.

In some embodiments, the first module may comprise a first neuron layer comprising 20 neurons, a second neuron layer comprising 100 neurons, and a third neuron layer comprising 20 neurons.

In some embodiments, the second module may comprise a first neuron layer comprising 64 neurons, a second neuron layer comprising 120 neurons, and a third neuron layer comprising 20 neurons.

According to another aspect, the present disclosure provides a method for estimating travel time and distance. The method may include obtaining a vehicle trip dataset comprising an origin, a destination, a time-of-day, a trip time, and a trip distance associated with each of a plurality of trips, and training a neural network model with the vehicle trip dataset to obtain a trained model. The neural network model may comprise a first module and a second module. The first module comprises a first number of neuron layers, and is configured to obtain the origin and the destination as first inputs to estimate a travel distance. The second module comprises a second number of neuron layers, and is configured to obtain the information of a last layer of the first module and the time-of-day as second inputs to estimate a travel time.

According to a further aspect, the present disclosure provides a non-transitory computer-readable medium for estimating travel time and distance. The non-transitory computer-readable medium stores instructions therein and the instructions, when executed by one or more processors, cause the one or more processors to perform the steps of obtaining a vehicle trip dataset comprising an origin, a destination, a time-of-day, a trip time, and a trip distance associated with each of a plurality of trips, and training a neural network model with the vehicle trip dataset to obtain a trained model. The neural network model may comprise a first module and a second module. The first module comprises a first number of neuron layers, and is configured to obtain the origin and the destination as first inputs to estimate a travel distance. The second module comprises a second number of neuron layers, and is configured to obtain the information of a last layer of the first module and the time-of-day as second inputs to estimate a travel time.

According to another aspect, the present disclosure provides a method for estimating a travel time. The method includes inputting information on an origin and a destination to a first trained neural network module to obtain a travel distance, and inputting time information and information of a last layer of the first trained neural network module to a second trained neural network module to obtain a travel time.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
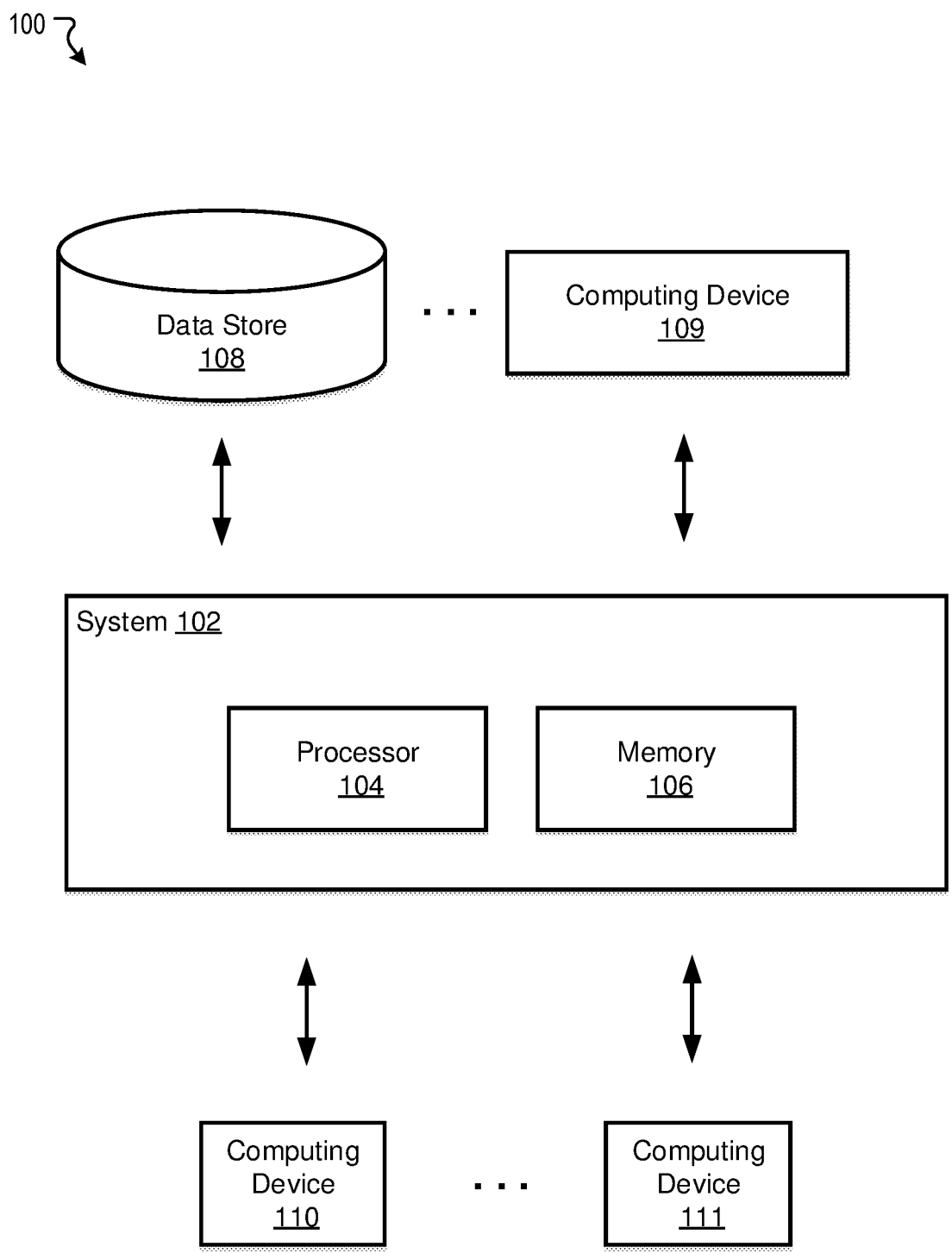
FIG. 1 illustrates an example environment for estimating travel time and distance, in accordance with various embodiments.

Estimating the travel time and distance for a transportation trip between Origin (o) and Destination (d) starting at a particular time (t) time-of-day can be challenging. Traditional machine learning methods for predicting time-varying origin-destination travel time and distance require feature engineering—manually creating the features necessary for carrying out the supervised learning. The performance of such methods critically depends on the quality of the features. An example traditional method for estimating travel time and distance is constructing a look-up table containing average travel time and distance information for all possible queries. However, this solution has several drawbacks. First, since the GPS coordinates are continuous variables, thus forming such a big look-up table requires a huge amount of memory to store. Second, most of the vehicle service applications that provide the travel time estimation to users aim to work in real time, that is updating the users about remaining travel time. So, frequently querying from such a big table will be time consuming. Finally, given the very sparse historical trip data, it is not possible to have a complete Cartesian product of origin×destination×time-of-day.

The disclosed systems and methods can overcome the problem set forth above in the realm of predicting time-varying origin-destination travel time and distance. In an example method, the trip $p_i$ used for model training can comprise a 5-tuple $(o_i, d_i, t_i, D_i, T_i)$, starting from the location $o_i$ at time $t_i$ heading to the destination $d_i$ where $D_i$ is the travel distance and $T_i$ is the travel time from origin to destination. Both the origin and destination can be represented by GPS (Global Positioning System) coordinates (e.g., $o_i=(Lat_i, Lon_i)$) or an alternative representation. Including the time-of-day $t_i$ as a part of trip can account for different traffic conditions at different time. For example, one can encounter heavy traffic at peak hours than off-peak hours. In some embodiments, it may be assumed that the intermediate location or travel trajectory is unknown, and only the end locations are available. Further, the disclosed systems and methods may receive a query $q_i$ as a pair (origin, destination, time-of-day)$_i$ input and obtain a corresponding pair (time, distance)$_i$ as output. That is, given a historical database of N trips $X=\{pi\}_{i=1}^{N}$, the disclosed systems and methods can estimate the travel distance and time $(D_q, T_q)$ for a query $q=(o_q, d_q, t_q)$.

Various embodiments of the present disclosure include systems, methods, and non-transitory computer readable media configured to estimate travel time and distance. In some embodiments, a computing system for estimating travel time and distance may comprise one or more processors and a memory storing instructions. The instructions, when executed by the one or more processors, may cause the computing system to obtain a vehicle trip dataset comprising an origin, a destination, a time-of-day, a trip time, and a trip distance associated with each of a plurality of trips, and to train a neural network model with the vehicle trip dataset to obtain a trained model. The neural network model may comprise a first module and a second module each corresponding to at least a part of the instructions. The first module may comprise a first number of neuron layers. The first module may be configured to obtain the origin and the destination as first inputs to estimate a travel distance. The second module may comprise a second number of neuron layers. The second module may be configured to obtain the information of a last layer of the first module and the time-of-day as second inputs to estimate a travel time.

In some embodiments, the computing system may comprise one or more servers implementing a vehicle information platform. The platform may be configured to receive transportation requests (e.g., from mobile devices of platform users), relay the requests to various vehicles (e.g., to mobile devices of vehicle drivers), and forward the information of vehicles accepting the requests to the users, based on which the users and the vehicles can meet up and carry out the transportation. At any time, a user can send a query to the computing system, causing the computing system to predict the travel time and distance, for example, before being transported or while being transported in a vehicle.

In some embodiments, based on a vehicle (e.g., taxi, platform-hailing vehicle) trip dataset collected through the global positioning system (GPS), the disclosed system can train a model to predict the travel time and distance together. The model as described in more details below may be referred to as a unified neural network (UnifiedNN). The model may first predict the travel distance between the origin and destination and then use this information along with time-of-day to predict the travel time. The UnifiedNN may only use the raw GPS coordinates of the origin and destination and time-of-day as input features to estimate the travel time and distance together. Compared with other travel time estimation methods, the UnifiedNN have greater generalization capabilities, can significantly reduce the mean absolute error (MAE) of both predicted travel time and distance, and is more robust to outliers in the dataset. Accordingly, the disclosed systems and methods can more accurately predict the travel time and distance.

FIG. 1 illustrates an example environment 100 for estimating travel time and distance, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the environment 100.

The environment 100 may include one or more data stores (e.g., a data store 108) and one or more computing devices (e.g., a computing device 109) that are accessible to the system 102. In some embodiments, the system 102 may be configured to obtain data (e.g., $o_i$, $d_i$, $t_i$, $D_i$, and $T_i$ for each of multiple vehicle transportation trips) from the data store 108 (e.g., a historical database or dataset of N transportation trips) and/or the computing device 109 (e.g., a computer, a server, a mobile phone used by a driver or rider that captures transportation trip information such as $o_i$, $d_i$, $t_i$, $D_i$, and $T_i$). The system 102 may use the obtained data to train models for estimating travel time and distance.

The environment 100 may further include one or more computing devices (e.g., computing devices 110 and 111) coupled to the system 102. The computing devices 110 and 111 may comprise devices such as cellphone, tablet, computer, wearable device (smart watch), etc. The computing devices 110 and 111 may transmit or receive data (e.g., a query for estimating travel time and distance, estimated travel time and distance) to or from the system 102.

In some embodiments, the system 102 may implement an online information or service platform. The service may be associated with vehicles (e.g., cars, bikes, boats, airplanes, etc.), and the platform may be referred to as a vehicle (service hailing) platform. The platform may accept requests for transportation, identify vehicles to fulfill the requests, arrange for pick-ups, and process transactions. For example, a user may use the computing device 110 (e.g., a mobile phone installed with an Application associated with the platform) to request transportation from the platform. The system 102 may receive the request and relay it to various vehicle drivers (e.g., by posting the request to mobile phones carried by the drivers). A vehicle driver may use the computing device 111 (e.g., another mobile phone installed with the Application associated with the platform) to accept the posted transportation request and obtain pick-up location information and information of the user. Some platform data (e.g., vehicle information, vehicle driver information, address information) may be stored in the memory 106 or retrievable from the data store 108 and/or the computing device 109. As described herein, the system 102 may receive a query q=(origin $o_q$, destination $d_q$, time-of-day $t_q$) and correspondingly estimate the travel distance and time ($D_q$, $T_q$).

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated. Various aspects of the environment 100 are described below in reference to FIG. 2 to FIG. 5.

Figure 2:
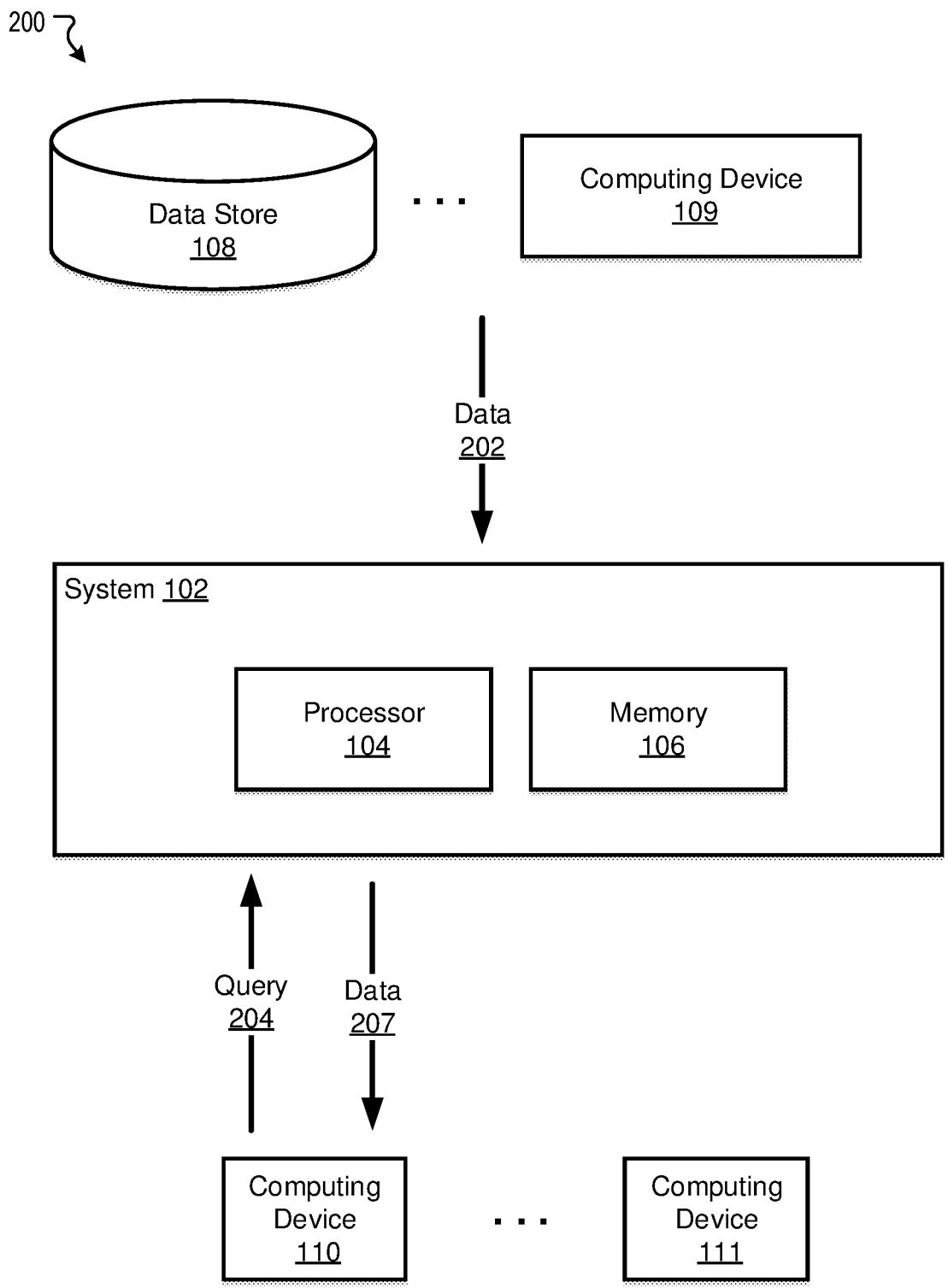
FIG. 2 illustrates an example system for estimating travel time and distance, in accordance with various embodiments.

FIG. 2 illustrates an example system 200 for estimating time and distance, in accordance with various embodiments. The operations shown in FIG. 2 and presented below are intended to be illustrative. In various embodiments, the system 102 may obtain data 202 from the data store 108 and/or the computing device 109. The obtained data 202 may be stored in the memory 106. The system 102 may train a model (e.g., the UnifiedNN) with the obtained data 202 to obtain a trained model for estimating travel time and distance. The computing device 110 may transmit a query 204 to the system 102, and the system 102 may predict the travel time and distance by applying the trained model to at least some information from the query 204. The predicted travel time and distance may be included in data 207 to be returned to the computing device 110 or one or more other devices.

Figure 3A:
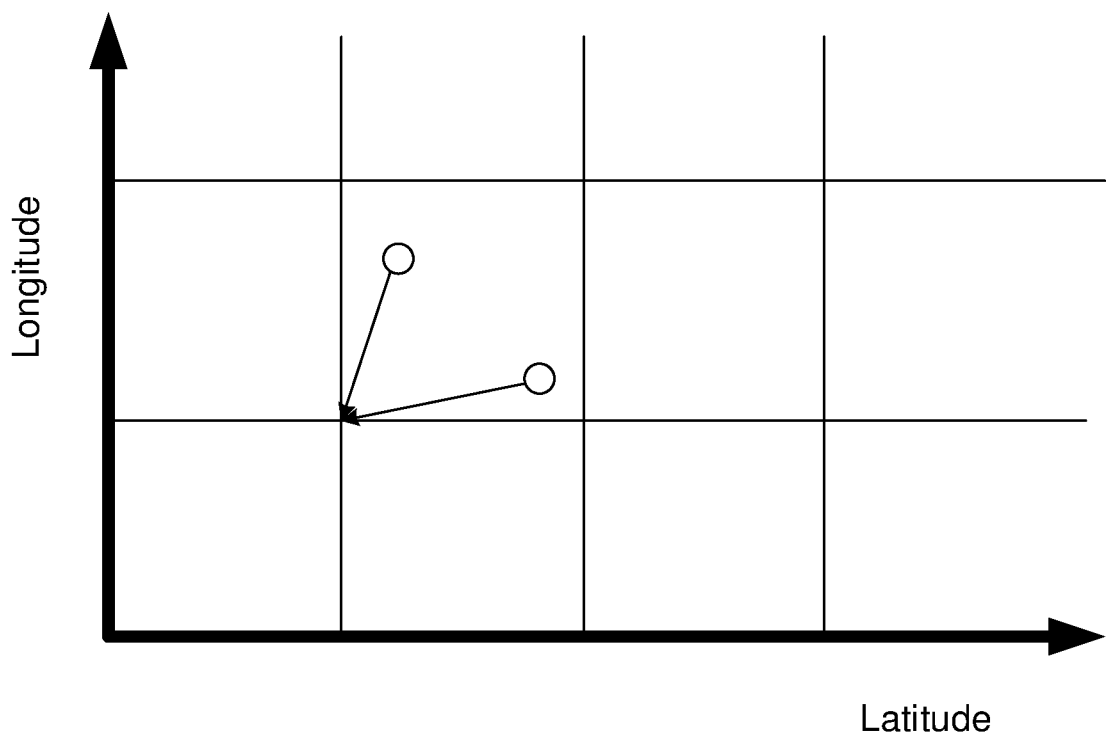
FIG. 3A illustrates an example method for pre-processing origin and destination, in accordance with various embodiments.

In some embodiments, the obtained data 202 may include information associated with each of various vehicle trips such as qi=($o_i$, $d_i$, $t_i$, $D_i$, $T_i$), which are respectively the origin, destination, time-of-day, distance, and time for the trip i. The origin and the destination may be represented by GPS coordinates or another representation. The distance may be trip travel distance in miles or another unit. The time may be the trip travel time in seconds or another unit. The vehicle trips may have been carried out by vehicles such as taxis, service-hailing vehicles, etc. The vehicle service, for efficiency reasons, may be assumed to route a driver on to a path that has the shortest distance between the origin and the destination irrespective of time-of-day. Further, $o_i$ and $d_i$ may comprise geo-coordinates, and several methods can be used to improve the accuracy of the geo-coordinates. For continuous variable geo-coordinates and in the urban cities (e.g., NYC), because of tall buildings and dense areas, it is possible to include erroneous GPS coordinates in reported the data. Other sources of erroneous recording of GPS coordinates involve atmospheric effects, multi-path effects and ephemeris, and clock errors. Therefore, to combat the uncertainties in GPS recording and "clean" the training dataset, one or more devices of the environment 100 (e.g., the system 102, the computing device 109) may perform data pre-processing on the raw GPS data to remove erroneous GPS coordinates. In one example, as shown in FIG. 3A, raw GPS coordinates may be discretized into 2-D square cells (e.g., with a degree of 200 meters in longitude ("Lon") and latitude ("Lat")), and all GPS coordinates inside a square cell can be represented by the lower left corner (or another preset point) of that square cell. In a few other examples, any trip meeting any the following conditions may be marked anomalous and removed from the training data: having more than seven or zero passenger in a taxi, having missing pickup or drop-off GPS coordinates, having a travel time of zero seconds while the corresponding travel distance is non-zero, having a travel distance of zero miles while the corresponding travel time is non-zero. Alternatively or additionally, other methods may be used to discretize or otherwise pre-process the raw data.

Similar to the location mapping, the time-of-day may be pre-processed. For example, the time-of-day may be discretized as 1-D time cells. For example, a day of 3600*24 seconds can be discretized by 10 minute cells to obtain 3600*24/60/10=144 cells. Each cell may correspond to an average trip time for a vehicle traveling from the corresponding time-of-day. Additionally, other pre-processing methods can be applied. For example, riders taking taxis or service-hailing vehicles may have different patterns depending on the day-of-week (e.g., longer rides at late nights on weekends), the season (e.g., longer rides in an extremely cold or hot season), the weather (e.g., longer rides during inclement weather), the geographic region (e.g., longer rides in a more spread-out metropolitan area), etc. Taking the day-of-week example, a weekday may correspond to 144 cells, and a weekend may correspond to another 144 cells, thus obtaining a total 288 time cells.

In various embodiments, the computing device 110 may make a query 204 directed to the system 102. Alternatively, another device or the system 102 itself may initiate the query 204. In any case, the query may be received by the system 102 at any time (e.g., before the user starts the transportation in a vehicle, when the user is being transported in a vehicle). The query 204 may include an origin, a destination, and a time-of-day, which may be transmitted by the computing device 110, collected or otherwise obtained by the system 102. In some embodiments, the origin may be associated with the location of the user. If the user is moving (e.g., riding in a vehicle), the origin may be constantly updated, and the travel time and distance estimation may be constantly updated accordingly.

Figure 3B:
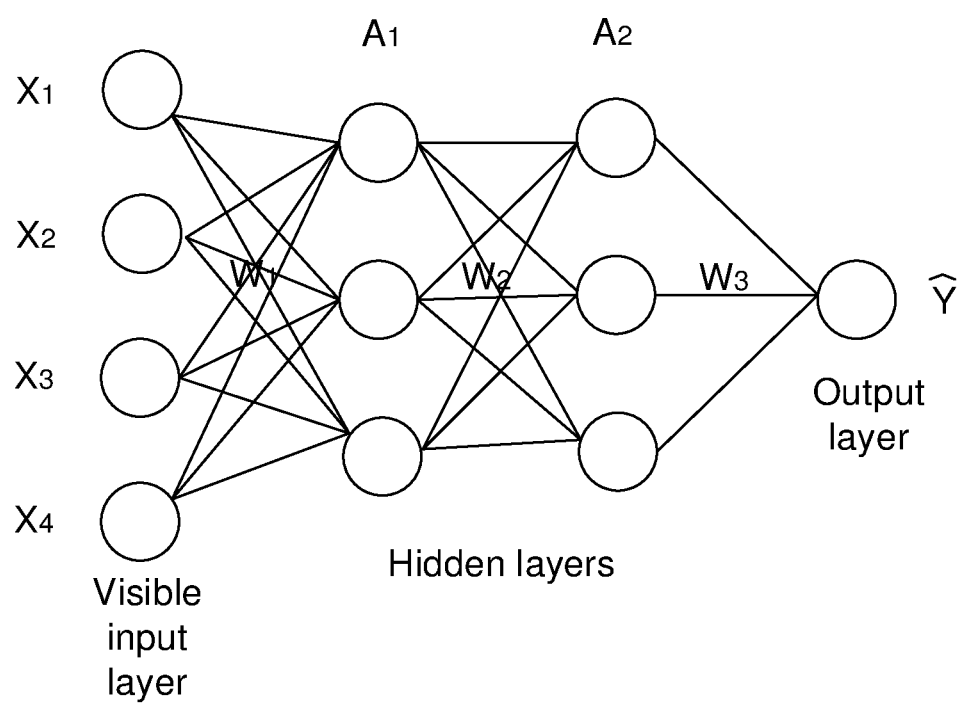
FIG. 3B illustrates an example neural network framework for estimating travel time and distance, in accordance with various embodiments.

In various embodiments, the UnifiedNN can learn feature representations from the training data and best map the features to the output variables. In addition, the UnifiedNN may be capable of learning any mapping from features to output and can approximate any non-linear function. The main framework of the UnifiedNN may be based on neural networks as describe below with reference to FIG. 3B. In neural networks, neurons may serve as the basic building block. A neuron may receive an input signal (e.g., input data), process it using a logistic computation function, and transmit an output signal (e.g., output data) depending on the computation outcome. When these neurons are arranged into networks of neurons, they are termed as neural networks. Each column of neurons in the network is called a layer, and a network can have multiple layers with multiple neurons in each layer. Network with single neuron is called perceptron and network with multiple layers of neurons is called multi-layer perceptron (MLP). A two hidden layer MLPs (layer $A_1$ and layer $A_2$) are shown in FIG. 3B, where the input layer comprises the inputs ($X_1, X_2, X_3, X_4$) to the network. The input layer is also called the visible layer because this may be the only exposed part of the network. Hidden layers derive features from the input layer at different scales or resolutions to form high-level features and output a value or a vector of values at the output layer. At each hidden layer, network may compute the features as:

$$A_1 = f(W_1 * X)$$

$$A_2 = f(W_2 * A_1)$$

$$\hat{Y} = f(W_3 * A_2)$$

Where, f is the activation function which takes the linear combination of weights (e.g., $W_1, W_2, W_3$) and outputs at the previous layer and outputs a value. Function f can be identical for all the hidden layers or can be different. A1, A2, and $\hat{Y}$ are the successive outputs of first hidden layer, second hidden layer, and the final output layer. For a given row of data X as an input to network, the network may process the input to obtain A1, A2 and finally obtain the predicted output $\hat{Y}$. This can be called forward pass. Then the predicted output $\hat{Y}$ can be compared with the expected output Y to compute an error using a loss function. The expected output Y may possess a high level of accuracy (e.g., independently verified result, manually obtained result, cross-checked result). The loss function measures the confidence level for the estimated outcome of the network. For example, in a regression problem, the mean square loss between predicted and expected output can be computed as:

$$L(Y, \hat{Y}) = \frac{1}{2N} \sum_{i=1}^{N} (Y^i - \hat{Y}^i)^2 \quad (1)$$

Where, N is the number of training data samples and $Y^i$ represents the expected output of $i^{th}$ training sample. This error can then be propagated back through the network using a backpropagation algorithm to update the weights $W_1, W_2, W_3$ for each layer according to stochastic gradient descent, one layer at a time. This can be called backward pass. The process of forward pass and backward pass can be repeated for all the data sample in training data, and one pass over the entire training dataset can be called an epoch. Thus, the neuron network can be trained to minimize the loss for a large number of epochs. Further, all the hyper-parameters such as number of layers in a network, number of neurons per layer, activation of neurons, the loss function may be tuned using cross-validation. Thus, by training and tuning described above, a trained neuron network can be obtained for accurately mapping from features to outputs. And in this disclosure, the features may comprise the origin, destination, GPS coordinates, and time-of-day, and the outputs may comprise the predicted travel time and distance.

Figure 3C:
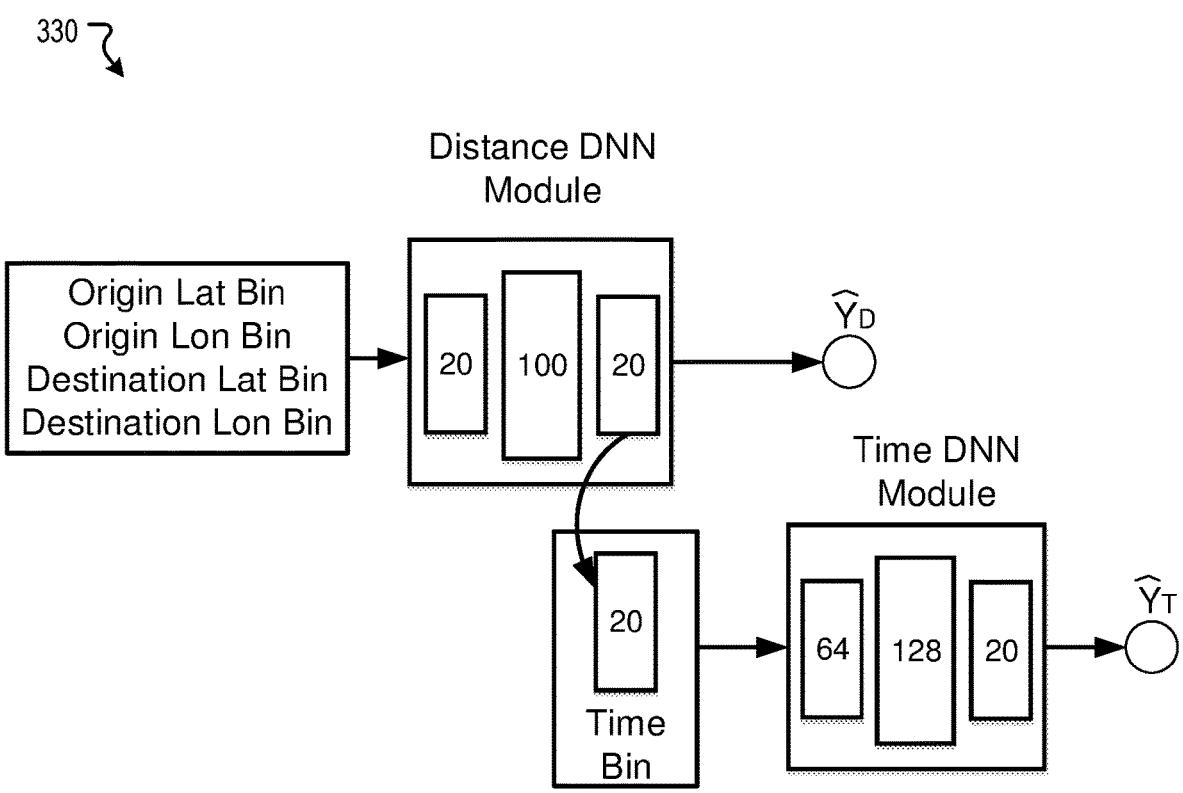
FIG. 3C illustrates an example neural network model for estimating travel time and distance, in accordance with various embodiments.

Referring to FIG. 3C, FIG. 3C illustrates an example UnifiedNN 330 for estimating travel time and distance, in accordance with various embodiments. The UnifiedNN and various modules (e.g., Distance DNN (deep neural network) Module, Time DNN Module) described herein may be implemented as instructions stored in the memory 106 described above. The instructions, when executed by the processor 104, may cause the system 102 to perform various methods and steps described herein.

In some embodiments, the UnifiedNN may comprise a "Distance DNN Module" for travel distance estimation and a "Time DNN Module" for travel time estimation. The input to Distance DNN module may comprise the origin $o_i$ and destination $d_i$ in binned GPS coordinates (Origin Lat Bin, Origin Lon Bin, Destination Lat Bin, Destination Lon Bin). The Distance DNN module may not be exposed to time-of-day $t_i$ information, because the time-of-day information is irrelevant to the travel distance estimation and may misguide the network. Therefore, the inputs to the Distance DNN module may comprise only the Origin Lat Bin, Origin Lon Bin, Destination Lat Bin, and Destination Lon Bin. The Distance DNN can accomplish predicting the travel distance. Further, the inputs to the Time DNN Module may comprise information of a last layer of the first module (e.g., activations or activation functions of the last hidden layer of the Distance DNN Module, the last hidden layer of the Distance DNN Module, the obtained travel distance output from the last layer, etc.) and the time-of-day information, because time-of-day information is related to the dynamic traffic condition information and is thus important for estimating the travel time. Thus, the Time DNN module can accomplish predicting the travel time.

In some embodiments, both the Distance DNN module and the Time DNN module may be three layer MLPs with various numbers of neurons per layer. FIG. 3C illustrates an example cross-validated number of neurons per layer parameters for these two modules configured for the best performance of accurate travel time and distance prediction. The Distance DNN model may comprise three hidden layers: a first layer of 20 neurons, a second layer of 100 neurons, and a third layer of 20 neurons. The Time DNN model may comprise three hidden layers: a first layer of 64 neurons, a second layer of 128 neurons, and a third layer of 20 neurons. $\hat{Y}_D$ and $\hat{Y}_T$ are the predicted distance and time from the Distance DNN module and the Time DNN module. The whole network can be trained jointly via stochastic gradient descent with the loss function:

$$L(Y_D, Y_T, \hat{Y}_D, \hat{Y}_T) = L(Y_T, \hat{Y}_T) + L(Y_D, \hat{Y}_D) \qquad (2)$$

From the equation (1), the loss function of equation (2) can be written as:

$$L(Y_D, Y_T, \hat{Y}_D, \hat{Y}_T) = \frac{1}{2N} \sum_{i=1}^{N} (Y_T^i - \hat{Y}_T^i)^2 + \frac{1}{2N} \sum_{i=1}^{N} (Y_D^i - \hat{Y}_D^i)^2 \qquad (3)$$

The disclosed methods (e.g., the UnifiedNN) can more accurately predict the travel time and distance than other methods such as: (1) Linear Regression for Time (LRT), a simple linear regression method for time estimation which models the travel time as a function of origin and destination defined by the 2-D square cell and the 1-D time cell number; (2) Linear Regression for Distance (LRD), a simple linear regression method for distance estimation which models the travel distance as a function of origin and destination defined by the 2-D square cell; (3) Time DNN module (TimeNN), a method where only the Time DNN module of the UnifiedNN is used to learn the travel time, and inputs to this module comprising only the origin and destination defined by the 2-D square cell and the 1-D time cell number; and (4) Distance DNN Module (DistNN), a method where only the Distance DNN module of the UnifiedNN is used to learn the travel distance, and inputs to this module comprising only the raw origin and destination defined by the 2-D square cell.

The disclosed methods are better than the simple linear regression method for travel time estimation (LRT), because the simple linear regression is a baseline method which does not consider the uncertain traffic conditions and simply tries to find the linear relationship between the raw origin-destination GPS coordinates and the travel time. Considering the temporal differences, the TimeNN can improve the travel time prediction from LRT by mapping the raw origin-destination GPS coordinates and time-of-day information to travel time. This can cause about 78% improvement in MAE. The disclosed method can add the encoded distance information for travel time prediction to the TimeNN, further improving the prediction performance. The MAE can be improved by approximately 13 seconds from the TimeNN to the UnifiedNN. Since the MAE may be averaged over millions of vehicle trips, the improvement of approximately 13 seconds in MAE is significant. The travel time and distance predictions are more accurate performed by the UnifiedNN than by the TimeNN, and the difference may increase with longer trips (e.g., longer than 12 Minutes or 720 Seconds). In some embodiments, short trips particularly those up to around 8-10 minutes are more prone to be effected by the temporal conditions, the disclosed methods may be all time better at capturing the dynamic conditions than other methods. In particular, the disclosed methods may offer significant benefits for short trips over other methods.

Similar to the LRT, the LRD performs worse than the UnifiedNN, because most vehicle service areas include urban cities, and it is very hard to find a straight route from the origin to destination. Thus, despite that the LRD always tries to strive for a linear pattern, finding a linear distance pattern is not an efficient approach. Further, the performance difference between the DistNN and the UnifiedNN is small, but the DistNN does not have a high performance travel time estimation as the DistNN method is calculated using only distance data without inputs on temporal conditions as further described herein.

Figure 4A:
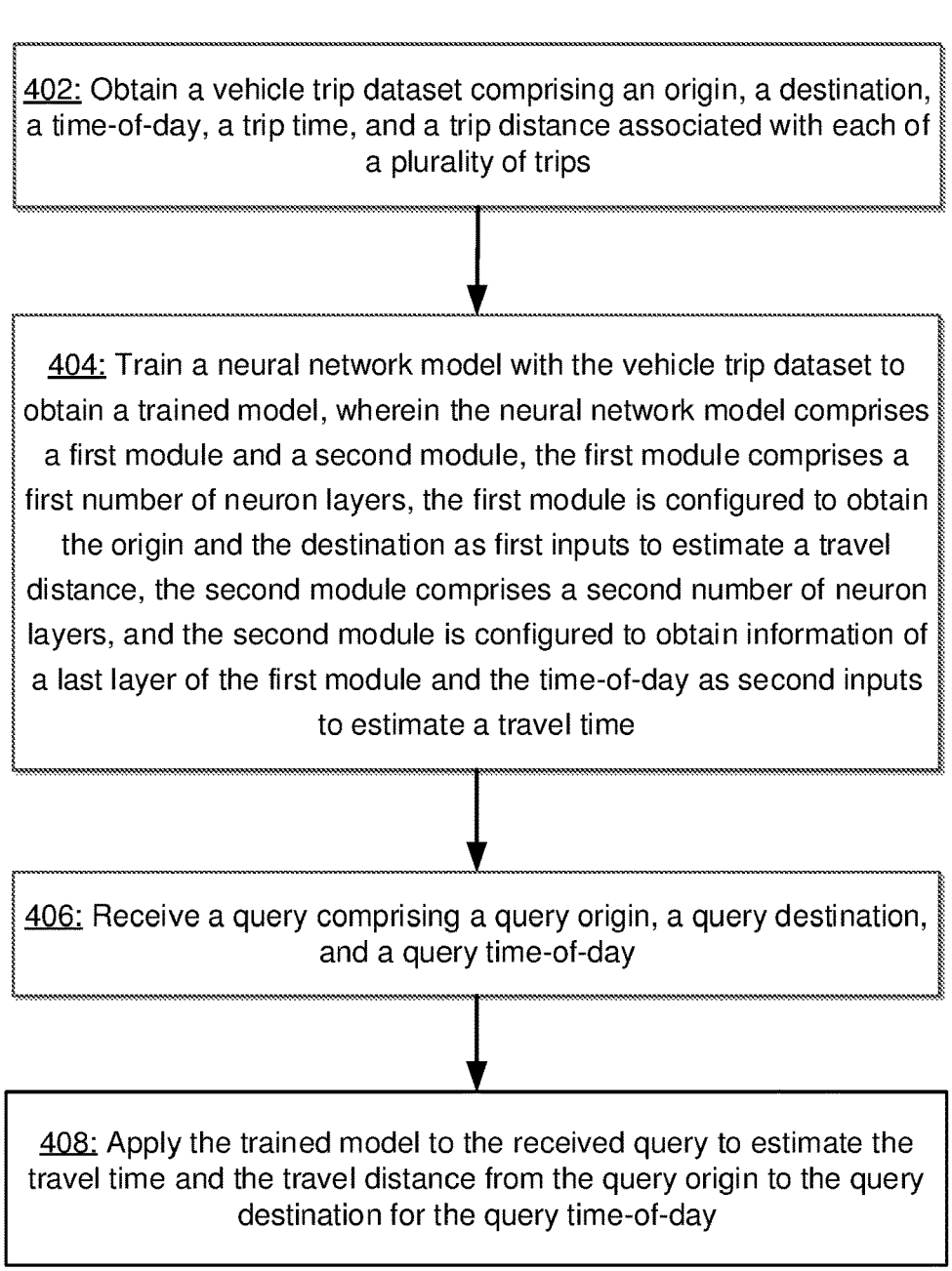
FIG. 4A illustrates a flowchart of an example method for estimating travel time and distance, in accordance with various embodiments.

FIG. 4A illustrates a flowchart of an example method 400, according to various embodiments of the present disclosure. The method 400 may be implemented in various environments including, for example, the environment 100 of FIG. 1. The example method 400 may be implemented by one or more components of the system 102 (e.g., the processor 104, the memory 106). The example method 400 may be implemented by multiple systems similar to the system 102. The operations of method 400 presented below are intended to be illustrative. Depending on the implementation, the example method 400 may include additional, fewer, or alternative steps performed in various orders or in parallel.

At block 402, a vehicle trip dataset of a plurality of trips may be obtained, the dataset comprising an origin, a destination, a time-of-day, a trip time, and a trip distance associated with each of the plurality of trips. In some embodiments, the origin and the destination may be pre-processed as described above, for example, to obtain binned GPS (Global Positioning System) coordinates. The trip time may also be pre-processed as described above to obtain binned trip time. At block 404, a neural network model may be trained with the vehicle trip dataset to obtain a trained model. The neural network model may comprise a first module and a second module each corresponding to at least a part of the instructions stored in the memory. The first module may comprise a first number of neuron layers. The first module may be configured to obtain the origin and the destination as first inputs to estimate a travel distance. The second module may comprise a second number of neuron layers. The second module may be configured to obtain the information of a last layer of the first module and the time-of-day as second inputs to estimate a travel time. In some embodiments, to train the neural network model with the vehicle trip dataset, the computing system 102 may be caused or configured to feed the origin and the destination to the first module to obtain the first number and a number of neurons in each of the first number of neuron layers, compare the estimated travel distance with the trip distance to tune the first number and the number of neurons in each of the first number of neuron layers, feed the information of the last layer of the first module and the time-of-day to the second module to obtain the second number and a number neurons in each of the second number of neuron layers, and compare the estimated travel time with the trip time to tune the second number and a number neurons in each of the second number of neuron layers. At block 406, optionally, a query may be received, the query comprising a query origin, a query destination, and a query time-of-day (here, the origin, the destination, and the time-of-day are modified by "query" to differentiate from the origin, the destination, and the time-of-day of the training dataset described above). At block 408, optionally, the trained model may be applied to the received query to estimate the travel time and the travel distance from the query origin to the query destination for the query time-of-day.

In some embodiments, the first module and the second module may be implemented as various instructions stored in a memory (e.g., the memory 106 described above). The instructions, when executed by a processor (e.g., the processor 104 described above), may cause the system (e.g., the system 102) to perform various steps and methods described herein. The first module may be a neural network model comprising three neuron layers, and the second module may be another neural network model comprising three neuron layers. The first module may comprise a first neuron layer comprising 20 neurons, a second neuron layer comprising 100 neurons, and a third neuron layer comprising 20 neurons. The second module may comprise a first neuron layer comprising 64 neurons, a second neuron layer comprising 120 neurons, and a third neuron layer comprising 20 neurons.

In some embodiments, the block 406 and the block 408 may illustrate applying a trained model to estimate the travel time and distance. For example, a user may submit the query when looking for a transportation (e.g., by a taxi or another vehicle) from the query origin to the query destination. The estimated travel time and distance returned to the user can provide important information for the user to decide when to take the transportation as planned. For another example, a user being transported (e.g., by a taxi or another vehicle) may constantly receive the updated travel time and distance estimation while riding in the vehicle based on the changing query origin (the real-time location of the vehicle or the user). The user may adjust the schedule accordingly based on the updated travel time and distance, make changes to the transportation route plan if necessary, etc. In any case, the user may actively submit the origin and destination (e.g., entered addresses, pinned locations on map) to the computing system 102, and/or the computing system 102 may actively capture the origin and destination (e.g., querying the computing device 110 for its current location to update the origin).

Figure 4B:
FIG. 4B illustrates a flowchart of an example method for estimating travel time, in accordance with various embodiments.

FIG. 4B illustrates a flowchart of an example method 450, according to various embodiments of the present disclosure. The method 450 may be implemented in various environments including, for example, the environment 100 of FIG. 1. The example method 450 may be implemented by one or more components of the system 102 (e.g., the processor 104, the memory 106). The example method 450 may be implemented by multiple systems similar to the system 102. The operations of method 450 presented below are intended to be illustrative. Depending on the implementation, the example method 450 may include additional, fewer, or alternative steps performed in various orders or in parallel. Various modules described below may have been trained, e.g., by the methods discussed above.

At block 452, information on an origin and a destination may be input to a first trained neural network module (e.g., the Distance DNN as described above) to obtain a travel distance. For example, a user may directly enter the origin and destination into a device and transmitted to the computing system 102. For another example, the computing system 102 may query a device (e.g., mobile phone) associated with the user to obtain or update the origin or destination. At step 454, time information (e.g., time-of-day information) and information of a last layer of the first trained neural network module (e.g., activations or activation functions of the last hidden layer of the Distance DNN Module, the last hidden layer of the Distance DNN Module, the obtained travel distance output from the last layer, etc.) may be input to a second trained neural network module (e.g., the Time DNN as described above) to obtain a travel time. The computing system 102 may feed the information of the last layer of the first trained neural network module to the second trained neural network module. The time-of-day information may be actively submitted by the user or actively obtained by the computing system 102. The input to Distance DNN module may comprise the origin $o_i$ and destination $d_i$ in binned GPS coordinates (Origin Lat Bin, Origin Lon Bin, Destination Lat Bin, Destination Lon Bin). The Distance DNN can accomplish predicting the travel distance. The inputs to the Time DNN Module may comprise information such as activations of the last hidden layer of the Distance DNN Module and the time-of-day information, because time-of-day information is related to the dynamic traffic condition information and is thus important for estimating the travel time. Thus, the Time DNN can accomplish predicting the travel time.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
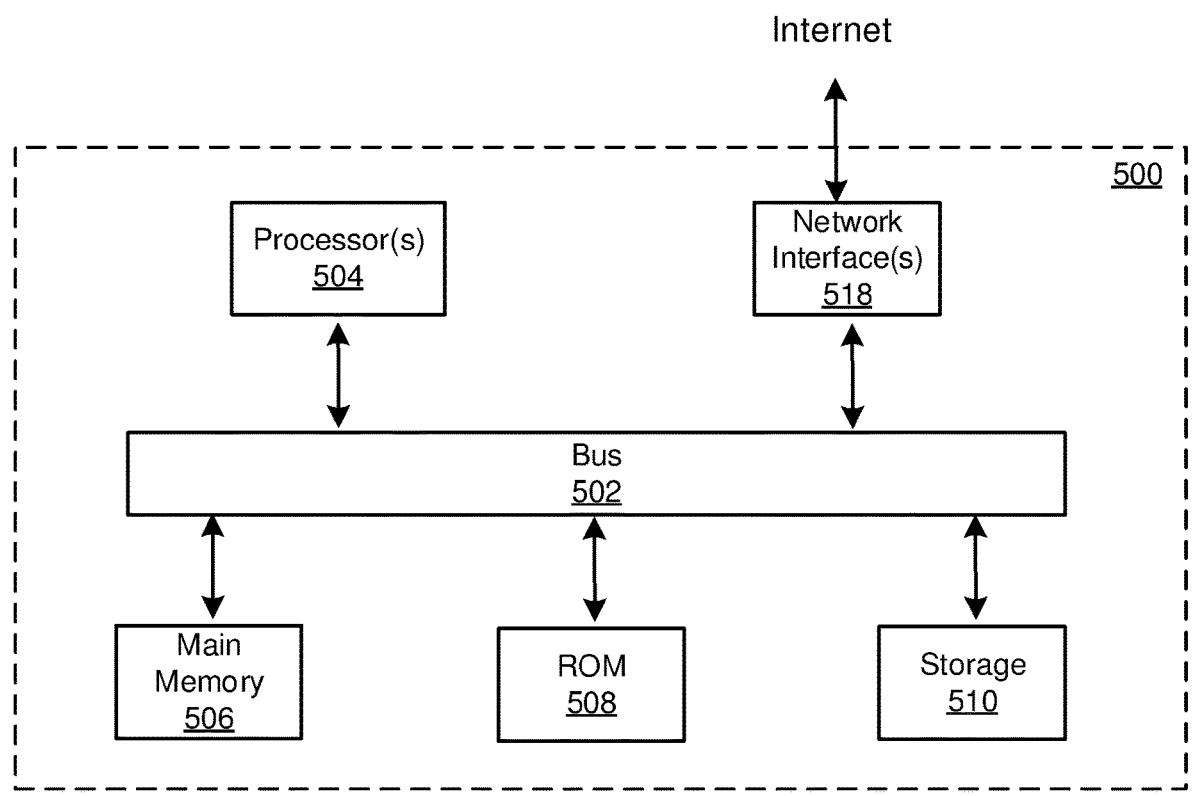
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computing system for estimating travel time and distance, comprising:
   one or more processors; and
   a memory storing instructions that, when executed by the one or more processors, cause the computing system to:
     obtain a vehicle trip dataset comprising an origin, a destination, a time-of-day, a trip time, and a trip distance associated with each of a plurality of trips, wherein the origin and the destination are represented as origin geo-coordinates and destination geo-coordinates, respectively;
     preprocess the vehicle trip dataset to:
       discretize the origin geo-coordinates and the destination geo-coordinates into respective spatial cells; and
       convert the origin geo-coordinates and the destination geo-coordinates into geo-coordinates of the respective spatial cells;
     train a neural network model with the preprocessed vehicle trip dataset to obtain a trained model, wherein:
       the neural network model comprises a first module and a second module;
       the first module comprises a first number of neuron layers;
       the first module is configured to receive the origin and the destination as first inputs and generate an estimated travel distance;
       the second module comprises a second number of neuron layers; and
       the second module is configured to:
         obtain information of a last layer of the first module, wherein the information comprise activations of the last layer of the first module and the estimated travel distance; and
         receive the obtained information of the last layer of the first module and the time-of-day as second inputs and generate an estimated travel time.

2. The computing system of claim 1, wherein the memory further stores instructions that, when executed by the one or more processors, cause the computing system to:
   receive a query comprising a query origin, a query destination, and a query time-of-day; and
   apply the trained model to the received query to estimate the travel time and the travel distance from the query origin to the query destination for the query time-of-day.

3. The computing system of claim 1, wherein:
   the origin and the destination each comprise binned GPS (Global Positioning System) coordinates; and
   the trip time comprises binned trip time.

4. The computing system of claim 1, wherein, to train the neural network model with the preprocessed vehicle trip dataset, the computing system is caused to:

feed the converted origin geo-coordinates and the converted destination geo-coordinates to the first module to obtain the first number and a number of neurons in each of the first number of neuron layers; and compare the estimated travel distance with the trip distance to tune the first number and the number of neurons in each of the first number of neuron layers.

5. The computing system of claim 4, wherein, to train the neural network model with the preprocessed vehicle trip dataset, the computing system is further caused to:

feed the information of the last layer of the first module and the time-of-day to the second module to obtain the second number and a number of neurons in each of the second number of neuron layers; and compare the estimated travel time with the trip time to tune the second number and a number of neurons in each of the second number of neuron layers.

6. The computing system of claim 1, wherein:

the first module is a neural network comprising three neuron layers; and the second module is another neural network comprising three neuron layers.

7. The computing system of claim 6, wherein the first module comprises:

a first neuron layer comprising 20 neurons;
a second neuron layer comprising 100 neurons; and
a third neuron layer comprising 20 neurons.

8. The computing system of claim 6, wherein the second module comprises:

a first neuron layer comprising 64 neurons;
a second neuron layer comprising 120 neurons; and
a third neuron layer comprising 20 neurons.

9. A method for estimating travel time and distance, comprising:

obtaining a vehicle trip dataset comprising an origin, a destination, a time-of-day, a trip time, and a trip distance associated with each of a plurality of trips, wherein the origin and the destination are represented as origin geo-coordinates and destination geo-coordinates, respectively;

preprocessing the vehicle trip dataset, wherein the preprocessing comprises:

discretizing the origin geo-coordinates and the destination geo-coordinates into respective spatial cells;

converting the origin geo-coordinates and the destination geo-coordinates into geo-coordinates of the respective spatial cells; and training a neural network model with the preprocessed vehicle trip dataset to obtain a trained model, wherein:

the neural network model comprises a first module and a second module;

the first module comprises a first number of neuron layers;

the first module is configured to receive the origin and the destination as first inputs and generate an estimated travel distance;

the second module comprises a second number of neuron layers; and the second module is configured to:

obtain information of a last layer of the first module, wherein the information comprise activations of the last layer of the first module and the estimated travel distance; and receive the obtained information of the last layer of the first module and the time-of-day as second inputs and generate an estimated travel time.

10. The method of claim 9, further comprising:

receiving a query comprising a query origin, a query destination, and a query time-of-day; and applying the trained model to the received query to estimate the travel time and the travel distance from the query origin to the query destination for the query time-of-day.

11. The method of claim 9, wherein:

the origin and the destination each comprise binned GPS (Global Positioning System) coordinates; and the trip time comprises binned trip time.

12. The method of claim 9, wherein training the neural network model with the preprocessed vehicle trip dataset comprises:

feeding the converted origin geo-coordinates and the converted destination geo-coordinates to the first module to obtain the first number and a number of neurons in each of the first number of neuron layers; and comparing the estimated travel distance with the trip distance to tune the first number and the number of neurons in each of the first number of neuron layers.

13. The method of claim 12, wherein training the neural network model with the preprocessed vehicle trip dataset comprises:

feeding the information of the last layer of the first module and the time-of-day to the second module to obtain the second number and a number of neurons in each of the second number of neuron layers; and comparing the estimated travel time with the trip time to tune the second number and a number of neurons in each of the second number of neuron layers.

14. The method of claim 9, wherein:

the first module is a neural network comprising three neuron layers; and the second module is another neural network comprising three neuron layers.

15. The method of claim 14, wherein the first module comprises:

a first neuron layer comprising 20 neurons;
a second neuron layer comprising 100 neurons; and
a third neuron layer comprising 20 neurons.

16. The method of claim 14, wherein the second module comprises:

a first neuron layer comprising 64 neurons;
a second neuron layer comprising 120 neurons; and
a third neuron layer comprising 20 neurons.

17. A non-transitory computer-readable medium for estimating travel time and distance, comprising instructions stored therein, wherein the instructions, when executed by one or more processors, cause the one or more processors to perform the steps of:

obtaining a vehicle trip dataset comprising an origin, a destination, a time-of-day, a trip time, and a trip distance associated with each of a plurality of trips, wherein the origin and the destination are represented as origin geo-coordinates and destination geo-coordinates, respectively;

preprocessing the vehicle trip dataset, wherein the preprocessing comprises:

discretizing the origin geo-coordinates and the destination geo-coordinates into respective spatial cells;

converting the origin geo-coordinates and the destination geo-coordinates into geo-coordinates of the respective spatial cells; and training a neural network model with the preprocessed vehicle trip dataset to obtain a trained model, wherein:

the neural network model comprises a first module and a second module;

the first module comprises a first number of neuron layers;

the first module is configured to receive the origin and the destination as first inputs and generate an estimated travel distance;

the second module comprises a second number of neuron layers; and the second module is configured to:

obtain information of a last layer of the first module, wherein the information comprise activations of the last layer of the first module and the estimated travel distance; and receive the obtained information of the last layer of the first module and the time-of-day as second inputs and generate an estimated travel time.

18. The non-transitory computer-readable medium of claim 17, wherein the instructions, when executed by one or more processors, further perform the steps of:

receiving a query comprising a query origin, a query destination, and a query time-of-day; and applying the trained model to the received query to estimate the travel time and the travel distance from the query origin to the query destination for the query time-of-day.

19. The non-transitory computer-readable medium of claim 17, wherein:

the first module is a neural network comprising three neuron layers; and the second module is another neural network comprising three neuron layers.

20. The non-transitory computer-readable medium of claim 17, wherein:

the first module comprises:
 a first neuron layer comprising 20 neurons;
 a second neuron layer comprising 100 neurons; and
 a third neuron layer comprising 20 neurons; and the second module comprises:
 a first neuron layer comprising 64 neurons;
 a second neuron layer comprising 120 neurons; and
 a third neuron layer comprising 20 neurons.

* * * * *